(12) United States Patent
Mahdjoubi Namin

(10) Patent No.: US 12,497,764 B2
(45) Date of Patent: Dec. 16, 2025

(54) SYSTEM FOR WATER DISTRIBUTION

(71) Applicant: ORBITAL SYSTEMS AB, Malmö (SE)

(72) Inventor: Amir Mehrdad Mahdjoubi Namin, Malmö (SE)

(73) Assignee: ORBITAL SYSTEMS AB, Malmo (SE)

( * ) Notice: Subject to any disclaimer, the term of this patent is extended or adjusted under 35 U.S.C. 154(b) by 220 days.

(21) Appl. No.: 18/265,989

(22) PCT Filed: Dec. 16, 2021

(86) PCT No.: PCT/SE2021/051267
§ 371 (c)(1),
(2) Date: Jun. 8, 2023

(87) PCT Pub. No.: WO2022/146217
PCT Pub. Date: Jul. 7, 2022

(65) Prior Publication Data
US 2024/0035260 A1 Feb. 1, 2024

(30) Foreign Application Priority Data
Jan. 4, 2021 (SE) .................... 2150002-0

(51) Int. Cl.
*E03B 1/04* (2006.01)
*C02F 103/00* (2006.01)

(52) U.S. Cl.
CPC ........ *E03B 1/041* (2013.01); *C02F 2103/002* (2013.01); *E03B 2001/045* (2013.01)

(58) Field of Classification Search
CPC ............... E03B 1/041; E03B 2001/045; C02F 2103/002
See application file for complete search history.

(56) References Cited

U.S. PATENT DOCUMENTS

| | | | | |
|---|---|---|---|---|
| 4,115,879 A | * | 9/1978 | Toms | E03B 1/04 210/138 |
| 4,753,265 A | * | 6/1988 | Barrett | G05D 23/1393 137/554 |

(Continued)

FOREIGN PATENT DOCUMENTS

| | | | | |
|---|---|---|---|---|
| CA | 2285808 A1 | * | 4/2001 | C02F 1/76 |
| DE | 4421668 A1 | * | 1/1996 | C02F 1/008 |

(Continued)

OTHER PUBLICATIONS

Swedish Search Report for Application No. 2150002-0 dated Jan. 4, 2021.

(Continued)

*Primary Examiner* — David Colon-Morales
(74) *Attorney, Agent, or Firm* — MOSER TABOADA

(57) ABSTRACT

A system for water distribution includes a core unit arranged to drive distribution of a water flow to one or more water user units; at least two water user units; and a control unit for operation of the system for water distribution. Two water user units have individual identities, and which the two water user units are connected to the control unit to enable for requesting for water of a certain flow and a certain temperature so that the control unit identifies which water user is making the request and then performs an activity based on the request.

11 Claims, 1 Drawing Sheet

(56) References Cited

U.S. PATENT DOCUMENTS

| | | | | |
|---|---|---|---|---|
| 4,756,030 A * | 7/1988 | Juliver | ............... | E03C 1/055 |
| | | | | 4/677 |
| 5,147,532 A * | 9/1992 | Leek, Jr. | ............... | E03B 1/04 |
| | | | | 210/182 |
| 5,868,937 A * | 2/1999 | Back | ............... | E03B 1/04 |
| | | | | 210/651 |
| 5,937,455 A * | 8/1999 | Donati | ............... | E03B 1/04 |
| | | | | 137/429 |
| 6,688,048 B2 * | 2/2004 | Staschik | ............... | E03D 5/003 |
| | | | | 52/220.1 |
| 6,702,942 B1 * | 3/2004 | Nield | ............... | E03B 1/04 |
| | | | | 210/418 |
| 9,074,355 B2 * | 7/2015 | Jallon | ............... | E03C 1/00 |
| 9,540,107 B2 * | 1/2017 | Boodaghians | ............ | C02F 9/00 |
| 9,644,350 B2 * | 5/2017 | Khalifeh | ............. | B01D 36/005 |
| 9,908,797 B2 * | 3/2018 | Tartakovsky | ............ | C02F 9/00 |
| 9,970,184 B2 * | 5/2018 | Green | ............... | E03C 1/264 |
| 10,053,841 B2 * | 8/2018 | Mahdjoubi Namin | ............... | |
| | | | | A47K 3/281 |
| 10,626,579 B1 * | 4/2020 | Hughes | ............... | E03B 1/041 |
| 11,104,586 B2 * | 8/2021 | Bertrand | ............... | C02F 1/001 |
| 11,713,561 B2 * | 8/2023 | Kitagawa | ............... | A47K 3/20 |
| | | | | 4/602 |
| 12,071,747 B2 * | 8/2024 | Han | ............... | C02F 1/001 |
| 12,209,397 B2 * | 1/2025 | Clarke | ............... | E03B 1/044 |
| 2008/0141455 A1 * | 6/2008 | Harrison | ............... | E03B 1/04 |
| | | | | 4/665 |
| 2010/0319790 A1 * | 12/2010 | Fleckner | ............... | E03B 1/04 |
| | | | | 137/334 |
| 2012/0192965 A1 * | 8/2012 | Popper | ............... | E03B 7/045 |
| | | | | 137/357 |
| 2013/0180928 A1 * | 7/2013 | Vielma | ............... | C02F 1/008 |
| | | | | 210/96.1 |
| 2016/0312447 A1 * | 10/2016 | Sparre | ............... | C02F 1/008 |
| 2016/0319522 A1 * | 11/2016 | Sparre | ............... | E03C 1/00 |
| 2018/0201516 A1 * | 7/2018 | Mahdjoubi Namin | ............... | |
| | | | | E03C 1/0408 |
| 2019/0323209 A1 * | 10/2019 | Mahdjoubi Namin | ............... | |
| | | | | H04L 67/12 |
| 2019/0323210 A1 * | 10/2019 | Mahdjoubi Namin | ............... | |
| | | | | E03B 1/041 |
| 2019/0323211 A1 * | 10/2019 | Mahdjoubi Namin | ............... | |
| | | | | E03B 1/048 |
| 2023/0167631 A1 * | 6/2023 | Haltmar | ............... | E03B 1/04 |
| | | | | 137/1 |

FOREIGN PATENT DOCUMENTS

| | | | | |
|---|---|---|---|---|
| DE | 4435304 C1 * | 5/1996 | ............... | C02F 3/04 |
| ES | 2187348 A1 * | 6/2003 | ............... | E03D 5/003 |
| ES | 2291138 A1 * | 2/2008 | ............... | E03B 1/044 |
| GB | 2424367 A * | 9/2006 | ............... | G05D 23/1393 |
| KR | 200358967 Y1 * | 8/2004 | | |
| WO | WO-9733676 A1 * | 9/1997 | ............... | C02F 1/008 |
| WO | WO-2008023084 A1 * | 2/2008 | ............... | E03B 1/04 |
| WO | WO-2010058187 A2 * | 5/2010 | ............... | C02F 9/005 |
| WO | WO-2012075592 A1 * | 6/2012 | ............... | E03B 1/04 |
| WO | WO-2018169474 A1 * | 9/2018 | ............... | A47K 3/28 |
| WO | WO-2019117782 A1 * | 6/2019 | | |
| WO | WO-2019164436 A1 * | 8/2019 | ............... | A47K 3/28 |
| WO | WO-2020121320 A1 * | 6/2020 | | |

OTHER PUBLICATIONS

International Search Report for Application No. PCT/SE2021/051267 dated Mar. 4, 2022.

* cited by examiner

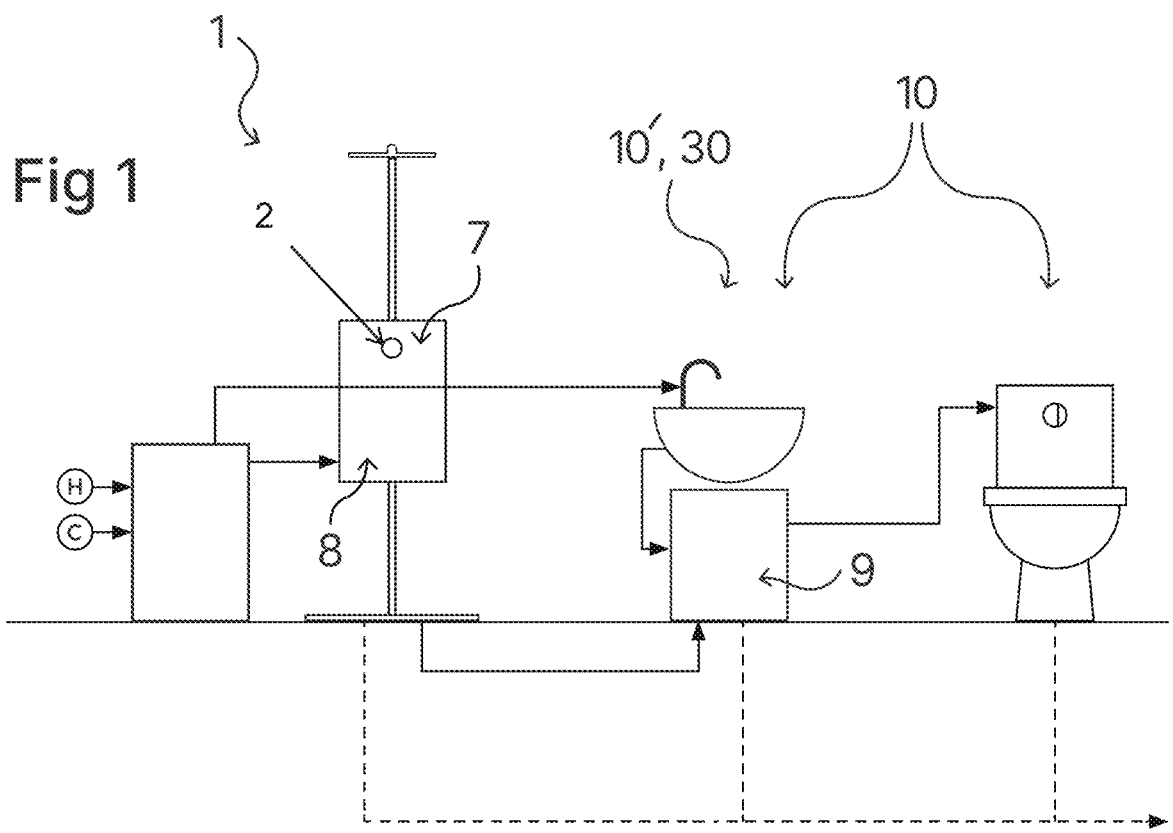
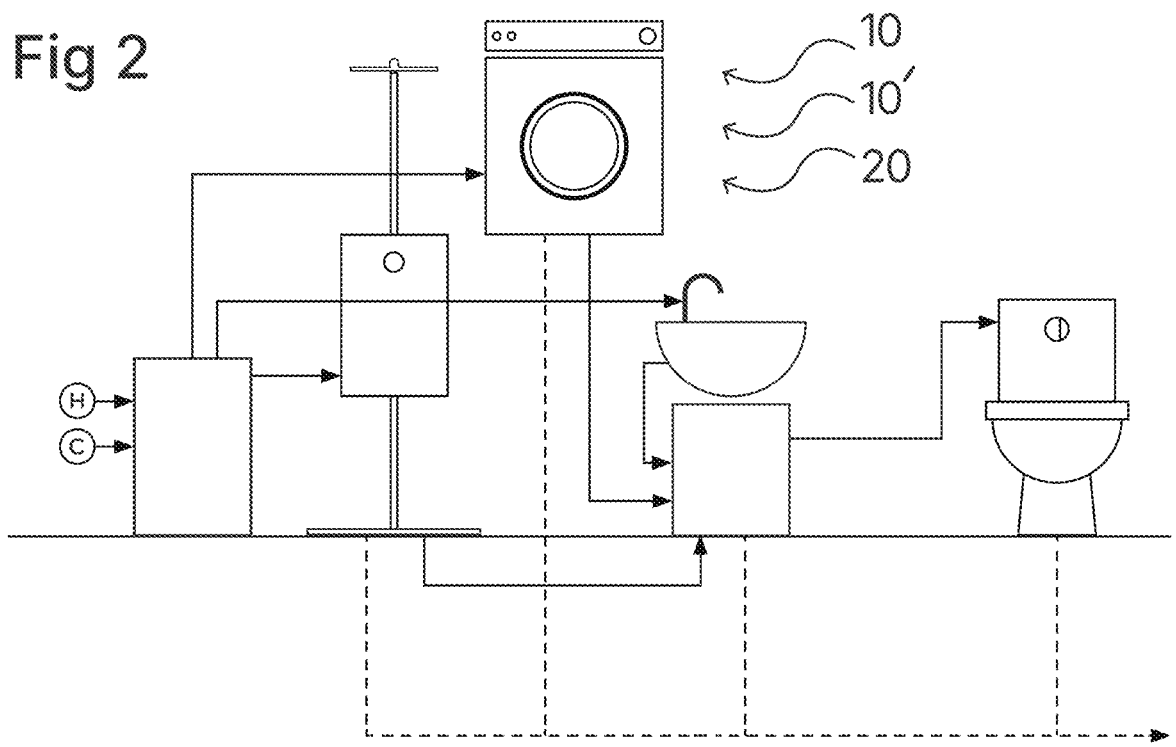

SYSTEM FOR WATER DISTRIBUTION

FIELD OF THE INVENTION

The present invention relates to a system for water distribution, especially such a system for water distribution intended for domestic use or the like, e.g. for the water distribution in a home or hotel or the like.

TECHNICAL BACKGROUND

There are water recycling systems today in which water is reused, also for domestic usage. Moreover, there are also systems where water of different quality is used for different purposes.

The present invention provides a smart system for water distribution, which enables optimal usage based on the intended usage of water.

SUMMARY OF THE INVENTION

The present invention is directed to a system for water distribution 1, said system comprising
- a core unit 7 arranged to drive distribution of a water flow to one or more water user units 10;
- at least two water user units 10;
- a control unit 2 for operation of the system for water distribution,
- wherein said two water user units have individual identities, and which said two water user units are connected to the control unit 2 to enable for requesting for water of a certain flow and a certain temperature so that the control unit 2 identifies which water user unit is making the request and then performs an activity based on the request.

BRIEF DESCRIPTION OF THE DRAWINGS

In FIG. 1 there is shown one specific embodiment of the present invention. In this case there is arranged a digital mixer with connection to fresh cold water (and hot water where cold fresh water has been heated). The system comprises a recirculation shower and a sink and tap with a tank which is used to hold water which in turn may be used for being flown to a toilette. As may be seen, all use drains may be interconnected with each other according to regular standards.

In FIG. 2 there is shown yet another specific embodiment of the present invention. In this case, also a washing machine is arranged in the system according to the present invention.

SPECIFIC EMBODIMENTS OF THE INVENTION

Below some specific embodiments of the present invention are provided. According to one specific embodiment of the present invention, the core unit 7 is directed to at least the parameters water flow, water temperature and water quality and to receive requests and perform activities on these parameters. Activities in this regard can be e.g. to increase or decrease the water flow or water temperature. Moreover, with reference of water quality, the activities may be based on deciding if to send water from a certain place or source based on a request used from a water user unit 10, and then sending water to the water user unit. Also set or dynamic thresholds may be used in this work so that the control unit 2 has limit values as certain requirements for different water user units.

According to yet another embodiment of the present invention, the core unit 7 has the capability to receive and process a request to perform activities, and also to change and improve water distribution in the system with reference to water consumption and/or energy consumption. This capability implies that the system according to the present invention may choice different sources of water and energy based on the status in the system, the request as such and also existing sources of water and energy. To give some examples, the core unit of the system according to the present invention may choice to limit the water flow if several water user units are requesting water at the same time. Moreover, if there are several energy sources, the core unit suitably chooses energy from a less expensive sort over more expensive energy when such optimization is possible. As an example, warm water already kept in the system may be used for an additional task, if the water quality if that fraction is high enough. The same type of choices on water quality is possible to perform for the core unit according to the present invention. Water quality, water flow and energy are the key aspects in this regard and are all such parameters possible to base optimization on in a core unit according to the present invention.

According to one embodiment of the present invention, at least one water user unit 10 is a water recirculating unit 10' which and has the capability of recirculating water or to flow water to another water user unit or to discard water, and where the core unit 7 is arranged also to drive water recirculation in said at least one water recirculating unit, said water recirculating unit preferably also being connected to a water treatment unit or system 8. One such example is a recirculating shower. Furthermore, the core unit may be the core unit of such a water recirculating unit, e.g. in a recirculating shower, and may be arranged to operate the entire system according to the present invention. The water treatment unit or system 8 may comprise a UV unit and/or a heater, or a UV and heater unit combined. Furthermore, such a system may also comprise other types of units, such as one or more filters, ozone treatment units and the like.

Furthermore, according to yet another embodiment of the present invention, the system also comprises at least one water storage tank 9 positioned subsequent to at least one water user unit 10. As an example, such a storage tank may be positioned in connection with a sink and tap 30 as the storage tank 9 to keep water used, which in turn may be reused when flushing in a toilette 40. Moreover, such a storage tank may be positioned in connection with several water user units, such as a washing machine 20, sink and tap 30 etc. Furthermore, according to one embodiment, said at least one storage tank comprises level control. This implies that if the storage tank is full and yet more water is sent to the storage tank the overflow is sent to be discarded in a drain or sent to yet another water storage tank in the system. This also implies that the system may comprise several storage tanks.

According to yet another specific embodiment, at least one water user unit is a sink with a tap. Furthermore, according to yet another embodiment, at least one water user unit is a washing machine. Moreover, according to yet another embodiment, the system also comprises a recirculating shower. It should be noted that a water distribution system according to the present invention may comprise any type of water user unit in a home, also e.g. in a kitchen, but especially any type of water user unit possible to provide in a bathroom or possible to connect to the water system in a bathroom. It should be noted that the present invention may be implemented also in other types of smart water user systems, such for hotels, sport and fitness arenas or the like.

According to yet another embodiment of the present invention, the system for water distribution 1 is arranged to provide distribution from one primary water user unit to at least one secondary water user unit, by means of gravitation or by means of an installed pump. Moreover, according to yet another embodiment, the system for water distribution is arranged to provide distribution from one primary water user unit to at least one secondary water user unit by means of gravitation. According to one specific embodiment, one primary water user unit is a sink with a tap 30 and a secondary water user unit is a toilette 40 or a water tank in connection with a toilette. Therefore, in one alternative according to the present invention, the system comprises a tank arranged subsequent to a sink with a tap. This water tank then suitably has an overflow arrangement so that if the tank is full, then an additional flow of water may be sent further either directly to another water user unit, such as to the main tank of a toilette, and/or to the drain. This water tank may also work as water reservoir for water needed when flushing a toilette. Furthermore, in this tank there may be arranged with disinfection and the like, which often is provided in a toilette. To give examples, one or more tablets or devices providing a disinfection agent, hygienisation agent or an agent affecting smell in a good way, may be provided in this tank.

Moreover, the water distribution system according to the present invention may also comprise a washing machine 20. This type of water user unit is operated such that when a washing cycle is intended to be performed, water of a certain temperature and flow is requested. The core unit according to the present invention then ensures to provide a water flow to the washing machine, which water flow is suitable for the washing machine. As an example, if there is a water flow of 30° C. requested from the washing machine and such water has been used and recirculated in e.g. a recirculating shower and kept in a tank, such as in the one mentioned above, this flow may be sent to the washing machine. It should also be noted that such water flow may come from the fresh water source directly. Moreover, if cold fresh water is flown into the system this may be admixed or heated up by hot water in the system. As such, energy is used in a smarter way in the entire system. This may also be true if a washing machine requests water of 60° C. In such a case, the water flow may be heated inside the system in an inexpensive way up to a possible temperature and then the washing machine may heat that water the rest up to 60° C. in the washing machine directly. This a smarter solution where it is not needed to use high value energy the entire way from cold water 5° C. and up to 60° C. in the washing machine directly by use of high value energy, such as e.g. electrical heating.

Furthermore, also used water from a washing machine may be sent to a tank and e.g. used subsequently when flushing a toilette.

Two different examples are shown in the figures. These are further explained below.

The present invention provides a smart water distribution system. On a first level, the system with its core or regulation unit ensures that a certain water user unit 10 is provided with a suitable flow of water when that water user unit provides a request relating to water flow, water temperature, and possibly also water quality. The water distribution system provides a suitable water flow taking also optimal energy consumption into account as well as total water consumption at a given time when e.g. several water user units are requesting water flows.

On a second level, the water distribution system also has a smart distribution between different water user units 10. On a general note of this second level, distribution is enabled by the regulation unit/core unit 7 (may be regarded as the same type of unit). The system suitably comprises a digital mixer, where hot and cold water from a fresh water source may admixed (see FIGS. 1 and 2). As such, the regulation unit may provide a certain water user unit with water of a certain temperature and flow. On a more detailed aspect of this second level, then water used in one water user unit be reused in a different water user unit 10. For instance, and as explained above, then a tank 9 may be positioned after a sink and tap 30. The water in this tank 9 may be used for flowing to a toilette 40 and for flushing in that toilette 40, and this transportation may be accomplished by gravitation only or by use of a pump, depending on the positing of different water user units. Moreover, here also the water quality parameter comes into play, i.e. a subsequent water user unit 10 which allows for a lower water quality is suitably provided down-streams in a system according to the present invention.

According to the present invention, there are certain situations when the core unit 7 has to perform a trade-off optimization when several water user units 10 are used at the same time, and when different energy sources are possible to use.

It should also be noted that a system according to the present invention suitably also comprises several sensors, which are arranged to measure flow, temperature and/or water quality. Different alternatives are possible, such as conductivity sensors. Also functionality sensors for the water treatment unit are totally possible, such as UV sensors and/or pressure sensors for a filter or the like.

The invention claimed is:

1. A system for water distribution, said system comprising:
   a core unit arranged to drive distribution of a water flow to one or more water user units;
   at least two water user units; and
   a control unit for operation of the system for water distribution,
      wherein said two water user units have individual identities, and which said two water user units are connected to the control unit to enable for requesting for water of a certain flow and a certain temperature so that the control unit identifies which water user unit is making the request and then performs an activity based on the request,
      wherein at least one water user unit is a water recirculating unit which is configured to recirculate water or to flow water to another water user unit or to discard water, and where the core unit is also arranged to drive water recirculation in said water recirculating unit, said water recirculating unit being connected to a water treatment unit or system.

2. The system for water distribution according to claim 1, wherein the core unit configured to control at least the parameters of water flow, water temperature, and water quality, and to receive requests and perform activities on these parameters.

3. The system for water distribution according to claim 2, wherein the core unit is configured to receive and process a request to perform activities, and also to change and improve water distribution in the system with reference to water consumption and/or energy consumption.

4. The system for water distribution according to claim 1, wherein the system also comprises at least one water storage tank positioned subsequent to at least one water user unit.

5. The system for water distribution according to claim 4, wherein said at least one storage tank comprises level control.

6. The system for water distribution according to claim 1, wherein at least one water user unit is a sink with a tap.

7. The system for water distribution according to claim 1, wherein at least one water user unit is a washing machine.

8. The system for water distribution according to claim 1, wherein the system also comprises a recirculating shower.

9. The system for water distribution according to claim 1, wherein the system for water distribution is arranged to provide distribution from one primary water user unit to at least one secondary water user unit, by means of gravitation or by means of an installed pump.

10. The system for water distribution according to claim 9, wherein the system for water distribution is arranged to provide distribution from the one primary water user unit to the at least one secondary water user unit by means of gravitation.

11. The system for water distribution according to claim 9, wherein the one primary water user unit is a sink with a tap and the at least one secondary water user unit is a toilette or a water tank in connection with the toilette.

\* \* \* \* \*